Jan. 3, 1928.
A. V. LIVINGSTON
1,655,231
VEHICLE DRIVING APPARATUS AND SYSTEM
Filed July 11, 1925
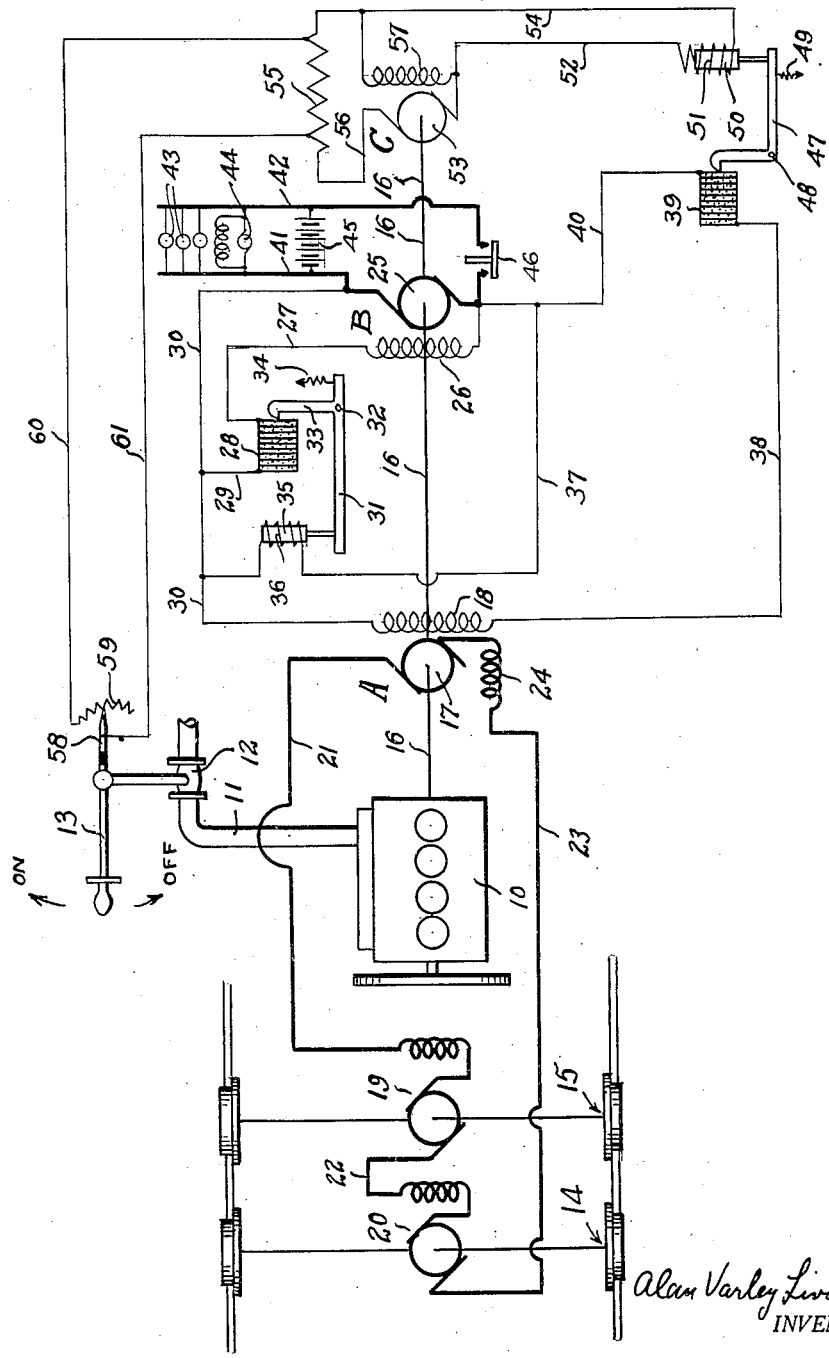
Alan Varley Livingston
INVENTOR.
BY Robert S. Blair
ATTORNEY.

Patented Jan. 3, 1928.

1,655,231

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

VEHICLE DRIVING APPARATUS AND SYSTEM.

Application filed July 11, 1925. Serial No. 42,975.

This invention relates to power transmissions and more particularly to the transmission of power from a prime mover to the driving wheels or axles of a vehicle, such as a locomotive, for example.

One of the objects of this invention is to provide a practical and thoroughly dependable system and apparatus for transmitting power from the prime mover to a variable load, of highly efficient operation and wide range of action. Another object is to provide a system and apparatus for transmitting power from a prime mover such as an internal combustion engine to a variable load in which a high degree of efficiency of transmission may be automatically attained throughout the widely varying conditions imposed upon the system and apparatus by the characteristics either of the prime mover or of the load itself. Another object of this invention is to provide a system and apparatus for transmitting power from a prime mover to the driving wheels or axles of a vehicle in which high efficiency and sensitive control throughout wide changes in conditions of load may be dependably and effectively achieved. Another object is to provide an electrical system and apparatus for carrying out in a thoroughly dependable way certain of the objects hereinabove noted and capable also of efficient action throughout wide changes in the conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing there is shown diagrammatically the apparatus and circuit arrangements illustrative of one of the various possible embodiments of this invention.

As conducive to a clearer understanding of certain features of this invention it may at this point be noted that a number of highly desirable practical advantages may be achieved in the use of a prime mover such as an internal combustion engine, for example, as a source of energy for driving vehicles such as locomotives for railway service. Because of the peculiar characteristics, however, of a prime mover of this type, as well as because of the peculiarly variable character of the load imposed upon a prime mover in such a relation, the achievement of such advantages is attendant in practice with not only difficulty but also the sacrifice of efficiency of operation. Such difficulties and sacrifices of efficiency, for example, become all the greater in magnitude as the range throughout which the changes in the character of the load take place increases; moreover, also, the inherent characteristics of this type of prime mover impose further obstacles in a degree depending upon the characteristics of the particular type of internal combustion engine. For example, while the conditions of speed and magnitude of the load imposed upon the prime mover by the vehicle driven thereby may, because of the wide variations and changes therein, contribute toward the difficulties of solving in an efficient manner the problem involved, yet the characteristics of a particular type of internal combustion engine may readily further increase such difficulties. Some prime movers of this type are characterized because of their inherent characteristics by the requirement of relatively wide speed changes to maintain the intended efficiency throughout the varying conditions of speed and magnitude of load imposed thereon. A dominant aim of this invention is to provide a system and apparatus in which the advantages of this type of prime mover may be achieved while maintaining a high degree of efficiency of operation, even though wide changes in speed of the prime mover itself may be required to achieve high efficiency as the characteristics of the load on the system change.

Referring now to the drawing, there is shown at 10 a prime mover preferably in the form of a gas or oil internal combustion engine; the latter is adapted to be supplied with appropriate fuel from any convenient source, as by the conduit 11, the latter being provided with a throttle 12 for controlling at will the supply of fuel to the prime mover 10, and hence to control the power output of the latter. The throttle or valve 12 is provided with the handle 13 for manual control thereof. The prime mover 10 and its associated apparatus may be mounted in any suitable manner upon the vehicle to be driven, only two pairs of wheels and associated axles 14 and 15 of the latter being shown in the drawing, for the sake of simplicity of illustration.

The prime mover 10 is provided with a driving shaft diagrammatically shown at 16, and operatively driven from the shaft 16 is the armature 17 of a generator generally indicated at A. The generator A is provided with an exciting field winding energized or excited preferably in a manner more clearly set forth hereinafter, and the output of the generator A supplies energy for driving one or more motors connected to the load to be driven, as, for example, connected to one or more of the axles or wheels of the vehicle. Thus, at 19 is diagrammatically indicated a motor operatively connected to the axle 15, and at 20 is indicated a motor connected to the axle 14. The motors 19 and 20 may take any suitable or appropriate form, and by way of illustration are shown in the drawing as being of the series type. If more than one driving motor is employed, for example, the two motors 19 and 20, as shown in the drawing, the motors may be connected to the generator A in any suitable or appropriate manner and in the drawing are illustratively shown as serially connected. Thus a conductor 21 leads the current output of the generator A to the motor 19, the current thence passing through the motor 19, then by way of conductor 22 to motor 20, and through the motor 20 and thence by way of conductor 23 back to the generator A. Preferably the generator A, to achieve certain advantages hereinafter described, is provided, in addition to the exciting field winding 18, with a differential field winding, and in the drawing the latter is indicated at 24 and as will be clear from the drawing, it will be seen that the current passing from the generator into or through the motor circuit or circuits passes through this differential field winding 24. The output energy of the generator A will thus be seen to be directly transmitted to the driving motors, and with this arrangement it will further be seen that simplicity of arrangement and absence of switching and control devices may be achieved.

Considering now the manner in which the exciting field winding 18 of the generator A is energized, it will be noted first that driven from the prime mover 10 and preferably connected directly thereto, as through the extended driving shaft thereof, is an exciter generator generally indicated at B, and as shown in the drawing the armature 25 of the exciter generator B is directly connected to the driving shaft 16 of the prime mover 10. The exciter generator B is preferably of the shunt wound type, and is hence provided with a shunt field winding 26; the circuit of this shunt winding 26 will be seen to extend from one terminal of the armature 25 of the generator B, thence through the field winding 26, and by way of conductor 27 through a variable resistance, taking the form preferably of a compressible carbon pile 28, and thence by way of conductors 29 and 30 back to the other terminal of the generator B.

The carbon pile 28 has associated with it a bell crank lever 31, pivoted as at 32, and provided with an upwardly extending arm 33 which bears against the free or unanchored end of the carbon pile 28. The spring 34 appropriately connected to the lever 31 tends to swing the lever 31 about its pivot 32 in such a direction that the compression of the carbon pile 28 is increased. At one end of the lever 31 there is connected a core 35 forming part of a solenoid, the coil 36 of which is connected by conductors 30 and 37 to the respective terminals of the armature 25 of the exciter generator B. With the arrangement thus far described in connection with the exciter generator B, the voltage of the output of the generator B will be maintained substantially constant irrespective of changes in the speed of drive of the armature 25 of the generator B, due to changes in the speed of the prime mover or internal combustion engine 10. A tendency to raise the voltage of the exciter generator B, due to an increase in the speed of the generator, is at once met by an increase in the resistance of the carbon pile 28 with a consequent and commensurate decrease in the exciting field current of the generator B. A decrease in speed of the exciter generator B will bring about a reverse action, and thus constancy of voltage of the output of the exciter generator B will be seen to be maintained. The voltage of the output of the generator B is such that it is sufficient to supply the exciting field winding 18 of the main generator A with ample excitation and to meet the maximum requirements in this respect of the main generator A.

The exciter generator B supplies exciting current to the field winding 18 through a circuit which will be seen to extend from one terminal of the generator B, thence by way of conductor 30 to one terminal of the main field winding 18 of the generator A, through the winding 18 and thence by way of conductor 38 a variable resistance 39 preferably in the form of a carbon pile and conductor 40 to the other terminal of the generator B.

Before considering in detail the control of the excitation supplied to the field winding 18 of the generator A, it may at this point be noted that apparatus of this general nature must be and usually is equipped with various auxiliary apparatus and devices; the latter may include motors for driving air compressors to supply air to the air-brake system of the vehicle or train, or for supplying air under pressure to the prime mover for various purposes, motors for driving blowers or the air cooling of any of the electrical or mechanical equipment, and such additional or auxiliary devices may also incude a lighting circuit for illumination of the vehicle or train. Also, various control devices may be electrically operated, and in order to insure the supply of energy to certain or all of the auxiliaries mentioned hereinabove by way of example, when the prime mover is at rest, I provide a storage battery which may be charged while the primer mover is operating, and may form the supply of energy to these devices when the prime mover is at rest. Such apparatus or devices either require a constant voltage supply of electrical energy and particularly in the case of storage battery, such a supply of energy is of material advantage in insuring the proper charge of the battery and protect the latter against overcharge. As hereinbefore noted, the exciter generator B I have arranged to have controlled so that its output is of substantially constant voltage, and I make this generator B of sufficient capacity to supply energy to such auxiliaries as are mentioned above.

Turning to the drawing, I have shown diagrammatically and by way of example a power circuit including the conductors 41 and 42, connected to the terminals of the exciter generator B; to this power circuit 41—42 and hence to the exciter generator B, may be connected, to be supplied with energy therefrom, the various auxiliary devices or apparatus. Among the latter, I have shown by way of example a series of lamps 43, a motor 44 of any suitable type, as illustrative of a possible auxiliary prime mover for driving a compressor or blower, for example, and a storage battery 45. The substantially constant voltage of the energy supplied by the exciter generator B permits not only the operation of auxiliary prime movers at a voltage most appropriate thereto and hence at their intended efficiency, but also insures an adequate charging of the battery 44 and the automatic safeguarding of the latter against over-charge. The lamps 43 which are illustrative of the lighting circuit of either the vehicle or train as a whole, may furthermore be thus supplied with energy at substantially constant voltage, and as to all of the auxiliary translating devices associated with the power circuit 41—42, it will be seen that the battery 45 may function as the source of energy supply thereto during periods of inactivity of the prime mover 10 and hence of the generator B. Any suitable form of automatic switch diagrammatically shown at 46 may be employed to connect or disconnect the generator B to the power circuit 41—42 in accordance with the activity or inactivity respectively of the generator B.

Considering in detail the control of the excitation of the winding 18 of the main generator A, it is first to be noted that the free or unanchored end of the carbon pile 39, which is arranged to control the flow of exciting current in the field winding 18, has related to it a bell crank lever 47 pivoted as at 48, a spring 49 being connected to the lever 47 so as to tend to swing the lever 47 in clockwise direction and thus to relieve the pressure on the carbon pile 39. Connected to the lever 47, however, is a core 50 of a solenoid, the winding 51 of which has one terminal thereof connected as by conductor 52 to one terminal of the armature 53 of an auxiliary generator C arranged to be driven by the prime mover 10 and diagrammatically shown as connected to the shaft 16 thereof; the other terminal of the solenoid winding 51 is connected to the other terminal of the armature 53 of the generator C but through the conductor 54, resistance 55 and then conductor 56. The armature 53 of generator C, driven by the prime mover 10, will thus partake of whatever variations in speed or tendencies to vary in speed which will be met with in the operation of the prime mover 10.

The generator C which may be and preferably is of relatively small capacity, may be of any suitable form or type, and very conveniently takes the form of a shunt wound direct current generator. The armature 53 hence has associated with it a field winding 57, one terminal of which is connected to one terminal of the armature 53 of generator C, whereas the other terminal of field 57 is connected to conductor 54 and thence through resistance 55 and conductor 56 to the other terminal of the armature 53. The generator C will thus be seen to be self-excited, and it will also be seen that the field winding 57 of generator C and the solenoid winding 51, being connected in parallel, will be affected by whatever changes in current output of the generator C that may be brought about either in changes in speed of the armature 53 or by changes by the effective value of the resistance 55.

The effective value of the resistance 55 is arranged to be changed by means of a current controlling device taking the form preferably of a variable resistance and, as will be clearly set forth hereinafter, preferably controlled by the throttle lever 13. Thus, for example, the lever 13 may carry a contact member 58 arranged to coact with a resistance 59, the current-controlling device 58—59 being thus shunted about a portion of the resistance 55 as by the conductors 60 and 61, and it will thus be seen that a movement of the control lever 13 will affect the current flowing not only to the field 57 of generator C, but also to the solenoid winding 51. These several parts are so arranged that as the lever 13 is moved to increase the supply of fuel to the prime mover 10 the effective value of the resistances 55—59 (in parallel) will be increased, and in the illustrative embodiment shown in the drawing such a movement of the lever 13 is made to increase the value of the resistance 59 and thus to cause a decrease not only in the excitation of the generator C but also in the excitation of the solenoid winding 51.

Such an action will result in imposing upon the generator C a condition analogous to a decrease in speed of the generator C and hence of the prime mover 10, and also bring about a direct decrease in the strength of the solenoid 50—51 so as to permit the spring 49 to increase the value of the resistance 39 in the circuit of the main field 18 of the main generator A. The movable parts of the solenoid 50—51 and the magnetic circuit of the latter are constructed in any suitable manner so that at any point within the intended range of movement of the movable core 50 the latter will remain in equalibrium when the normal or intended voltage is impressed upon the solenoid winding 51.

The auxiliary generator C, however, is preferably so constructed that it will be relatively sensitive to changes. Its field circuit is preferably so arranged and constructed that the desired or normal voltage will be produced across the terminals of the generator solenoid winding 51 at substantially the lowest speed at which the prime mover is to be run when delivering power to the load, and has the further characteristic that, under such conditions as the above-mentioned, the generator is operating at a relatively steep portion of its staturation curve and preferably substantially midway between the upper and lower knee of the curve. This portion of the saturation curve will be not only relatively steep, but also substantially rectilinear, and a relatively slight change in speed of the armature 53 of the generator will cause a prompt and substantial change in the voltage of its output to take place.

But, as hereinbefore noted, the characteristic of the prime mover or internal combustion engine 10 may be such that, to maintain the intended or desired efficiency throughout the wide range of load changes to which it is subjected, a relatively wide range of change in speed of the internal combustion engine may be requisite. Such a wide change in speed of the prime mover will also characterize the rotation of the armature 53 of the auxiliary generator C, and then tend to cause such a change in the portion of the saturation curve throughout which the generator C is to operate that the intended action cannot be effectively achieved, and the sensitiveness of control detrimentally affected where this range of change in speed becomes relatively great. But by means of my invention, the intended sensitivity of action and positiveness of control of the system and apparatus may be effectively achieved irrespective of such wide changes in speed of not only the prime mover 10, but also of the auxiliary generator 53. How this is achieved may be made clear by considering the operation of the apparatus and system.

Considering the operation of the apparatus and system, it may first be pointed out that efficiency of transmission of power from the prime mover 10 to the load is dependent to a substantial extent upon the speed of the prime mover itself, and particularly is this the case where the prime mover takes the preferred form of an internal combustion engine; to maintain the desired efficiency of transmission throughout the changing conditions in the load a corresponding speed of rotation of the internal combustion engine should be maintained and the range of speed throughout which the internal combustion engine may operate to maintain this desired efficiency may, in some instances, be as great as to necessitate an increase in its speed of 100% or greater.

To make for a clearer understanding of certain features of this invention, it may be noted that, in locomotive or vehicle driving systems it is not infrequent to have conditions arise where the prime mover becomes overloaded. For example, if the locomotive or vehicle is moving along a substantially level roadbed, the load on the internal combustion engine will be substantially constant, but should the locomotive or vehicle strike an up-grade in the roadbed, the load on the system and apparatus, being already substantial, becomes increased and its first effect upon the prime mover is to slow down its speed of rotation. If at such a moment the throttle lever 13 is moved to increase the supply of fuel to the engine, then this increased fuel supply finds the engine in a condition of diminished speed, and the engine fails to "pick up" or picks up slowly or with great difficulty. The source of power, under such conditions, thus becomes greatly weakened at the exact moment when high efficiency and magnitude of energy output are most needed.

But such a tendency to overload the engine 10 and thus to decrease its speed will be seen, by reason of my invention, to bring about a corresponding diminution in the speed of rotation of the armature 53 or auxiliary generator C. But this change in speed of the armature 53 of auxiliary generator C is at once made to diminish the voltage impressed upon the winding 51 of the solenoid 50—51, and the spring 49 attached to the lever 47 is at once made effective to relieve the pressure on the carbon pile 39, reduce the resistance in the latter, and cut down the excitation current flowing to the main field 18 of the generator A. The output of the main generator A is thus at once decreased, and the prime mover 10, being thus relieved of a portion of its load, is permitted promptly to increase its speed. The differential field winding 24 is advantageously utilized to assist this action of cutting down the output of the generator A, inasmuch as the initial increase in load is made effective to cause the motors 19 and 20 to draw more current from the main generator A, and this increased current acting through the differential field 24, assists in reducing the output of the generator A.

The output of the generator A having thus been decreased and the load on the prime mover 10 likewise decreased, the latter, as above noted, increases its speed and tends to achieve such a speed of rotation that the voltage of the auxiliary generator C is brought back to substantially normal value, and so that the solenoid 50—51 can be thus made effective to prevent too great an increase in the speed of the prime mover 10. But during this increased speed of the prime mover 10, the throttle lever 13 may be moved in a direction to increase the fuel supply to the engine 10, and the latter will promptly respond inasmuch as it is operating at an increased speed, and moreover at a speed appropriate to make its response to the greater fuel supply thereto prompt. The output of the prime mover 10 may thus promptly supply the increased demands upon it, made, for example, by reason of the fact that the train or locomotive is ascending an up-grade in its path of travel, as hereinbefore assumed illustratively.

But the same movement of the throttle lever 13 to increase the fuel supply to the engine 10 has caused a change in the effective value of the parallel resistances 55—59 and its initial action is to impose upon the auxiliary generator C a condition analogous to a decreased speed of rotation thereof, inasmuch as the excitation of the latter generator is decreased. But the same action is made also to decrease the current flowing to the solenoid winding 51, the latter is thus weakened, and the excitation current flowing to the main winding 18 of the generator A is thus diminished further to insure the desired speed increase in the engine 10 to meet effectively the increased fuel supply thereto and to prevent conditions arising which make it difficult for the engine to "pick up."

The auxiliary generator C, as hereinbefore noted, is preferably made to operate at a preferred or predetermined portion of its saturation curve in order to achieve the advantages of relatively sensitive action thereof in response to speed changes. But as soon as a new standard of speed is set for the prime mover 10, and hence for the auxiliary generator C, the portion of the saturation curve of the latter and throughout which it will then operate will be changed, and within a given range, such a change will produce thoroughly effective and reliable results. But should the internal combustion engine be of such a character that, to maintain the desired degree of efficiency, a still greater change in speed is necessitated, a condition will soon be approached and reached where, in response to this greater increase in speed, the generator C will be made to operate at such a portion of its saturation curve that the desired sensitiveness will not be achieved. For example, the speed of the apparatus may be so greatly increased that the generator C will be made to operate beyond the knee in the saturation curve, and hence at a portion where the desired sensitiveness cannot be achieved. But the throttle lever 13 aside from bringing about an increased fuel supply to the prime mover 10 and setting in effect a new standard of speed for the latter is further made effective to maintain the operation of the auxiliary generator C at substantially the same or fixed portion of its saturation curve or operating characteristics. This is brought about by reason of the fact that a change in the effective value of the parallel resistances 55—59 affects to like extent both the field winding 57 of generator C and the solenoid winding 51. Inasmuch as the latter is so arranged to maintain a new standard of speed of the apparatus substantially constant and at the voltage for which it and its associated parts are adjusted, the solenoid winding 51 will in effect so control the system and apparatus through the carbon pile 39 that the voltage impressed upon it will be maintained substantially constant, even though wide ranges in speed of the apparatus may take place as one new standard is set after another to meet the changing conditions in the load; but the same voltage that is impressed upon the solenoid winding 51 is impressed also upon the field 57 of generator C, and thus the saturation at which the magnet circuit of the generator C operates will be prevented from exceeding a value corresponding to this substantially constant voltage, and the generator C will thus be prevented from operating beyond a given point on its saturation curve. Sensitiveness of control is thus achieved, and a wide range of change of speed of the prime mover and associated apparatus is made possible.

The prime mover 10 may thus have any speed-power output curve or characteristic, and moreover one which may be accompanied by very wide changes in speed; and irrespective of the changing characteristics of the load, either as to magnitude or speed, the speed-power output characteristic of the prime mover 10 may be made to match very closely the characteristics of the load even though the prime mover be one in which wide changes of speed are necessary to achieve the intended efficiency and power output. And this advantage may, moreover, be achieved without sacrifice of sensitiveness of control and promptness of action by, for example, the auxiliary generator C, as will be clear from the foregoing.

It will be understood that any desired switching or control devices may be interposed between the main generator A and the motor or load supplied thereby, such as appropriate devices for connecting and disconnecting the motors or load to or from the generator as may be desired; for the sake of simplicity, however, I have not illustrated such devices in the drawing as well as for the purpose of more clearly showing by way of example how the demands of the load may be efficiently met through the simple and advantageous arrangement of controlling the power output of the internal combustion engine, as by means of the throttle valve associated therewith.

It will thus be seen that there has been provided in this invention a system and apparatus for the transmission of power in which the several objects hereinbefore noted, as well as many thoroughly practical advantages, are successively achieved, and it will further be seen that the apparatus and system are well adapted to meet not only the widely varying characteristics of the load itself, but also the widely varying characteristics which may be inherent in the prime mover itself.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the character described, in combination, an internal combustion engine, a generator driven thereby, a load supplied with energy from said generator, an exciter for supplying excitation current to said generator, means including a coil for controlling the flow of excitation current from said exciter to said generator, an auxiliary generator driven by said engine and having its field winding and said coil connected in parallel across the armature thereof, and means for changing the standard of operation of said auxiliary generator and arranged to effect the excitation of both said field winding and said coil.

2. In apparatus of the character described, in combination, an internal combustion engine, a generator driven thereby, a load supplied with energy from said generator, an exciter for supplying excitation current to said generator, means including a coil for controlling the flow of excitation current from said exciter to said generator, an auxiliary generator driven by said engine for supplying exciting current to the field winding thereof and to said coil, and a current-controlling device interposed between the output terminals of said auxiliary generator and the field winding thereof and said coil.

3. In apparatus of the character described, in combination, an internal combustion engine, a generator driven thereby, a load supplied with energy from said generator, an exciter for supplying excitation current to said generator, means including a coil for controlling the flow of excitation current from said exciter to said generator, a resistance, an auxiliary generator driven by said engine for supplying exciting current through said resistance to the field of said auxiliary generator and to said coil, means for controlling the supply of fuel to said engine, and means responsive to the operation of said last-mentioned means for affecting said resistance.

4. In apparatus of the character described, in combination, a prime mover; a load driven therefrom; power transmission means interposed therebetween; means adapted to prevent said transmission means, upon an increase in the said load, from increasing the load on said prime mover, said means including a coil for determining the effectiveness of said transmission means, an auxiliary generator driven by said prime mover and supplying energy to said coil; and means for changing the standard of operation of said auxiliary generator, the field winding of said generator being connected in parallel with said coil.

5. In apparatus of the character described, in combination, a prime mover; a load driven therefrom; power transmission means interposed therebetween; means adapted to prevent said transmission means, upon an increase in the said load, from increasing the load on said prime mover, said means including a coil for determining the effectiveness of said transmission means, an auxiliary generator driven by said prime mover and supplying energy to said coil; means for controlling the power output of said prime mover; and means responsive to the operation of said last mentioned means for changing the standard of operation of said auxiliary generator, the field winding of said auxiliary generator being connected in parallel with said controlling coil.

6. In apparatus of the character described, in combination, a prime mover; a generator driven thereby; a load supplied with energy by said generator; means adapted upon a decrease in speed of said prime mover to decrease the output of said generator, said means including an auxiliary generator driven by said prime mover, and means for maintaining the excitation current of said auxiliary generator substantially constant.

7. In apparatus of the character described, in combination, a prime mover; a generator driven thereby; a load supplied with energy by said generator; means adapted upon a decrease in speed of said prime mover to decrease the output of said generator, said means including an auxiliary generator driven by said prime mover and having an exciting field winding; and means for changing the standard of operation of said auxiliary generator arranged to maintain substantially the same excitation current in the field winding thereof irrespective of the change in standard of operation of said auxiliary generator.

8. In apparatus of the character described, in combination, a prime mover; a generator driven thereby; a load supplied with energy by said generator; means adapted upon a decrease in speed of said prime mover to decrease the output of said generator, said means including an auxiliary generator driven by said prime mover and having an exciting field winding; means for controlling the power output of said prime mover; and means responsive to the operation of said controlling means arranged to change the standard of operation of said auxiliary generator but without substantially affecting the magnetic saturation at which said auxiliary generator operates.

9. In apparatus of the character described, in combination, a prime mover; a load driven therefrom, power transmission means interposed therebetween, electromagnetic means for controlling the effectiveness of said transmission means; an auxiliary generator responsive to speed changes in said prime mover for controlling said electromagnetic means; and means for changing the standard of operation of said control means and arranged to maintain substantially the same effective magnetic saturation of said auxiliary generator as a new standard of operation is achieved.

10. In apparatus of the character described, in combination, a vehicle, an internal combustion engine carried thereby, power transmission means interposed between said prime mover and a wheel of said vehicle, electromagnetic means for controlling the effectiveness of said transmission means, an auxiliary generator responsive to speed changes in said engine for controlling said electromagnetic means, and means for changing the standard of operation of said control means and arranged to maintain substantially the same effective magnetic saturation of said auxiliary generator as a new standard of operation is achieved.

11. In apparatus of the character described, in combination, a vehicle, an internal combustion engine carried thereby, a motor for driving a wheel of said vehicle, a generator driven by said engine and supplying energy to said motor, means adapted upon a decrease in speed of said engine to decrease the output of said generator, said means including an auxiliary generator driven by said engine and having an exciting field winding, means for controlling the power output of said engine and means responsive to the operation of said last-mentioned means arranged to change the standard of operation of said auxiliary generator but without substantially affecting the magnetic saturation at which said auxiliary generator operates.

In testimony whereof, I have signed my name to this specification this ninth day of July, 1925.

ALAN VARLEY LIVINGSTON.